No. 711,043. Patented Oct. 14, 1902.
C. B. EASTY.
ROTARY FLUE CLEANING CUTTER.
(Application filed Sept. 26, 1899.)
(No Model.)
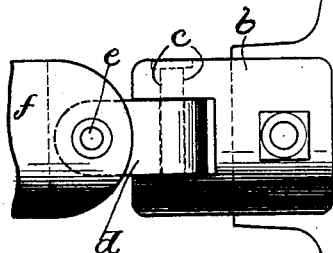
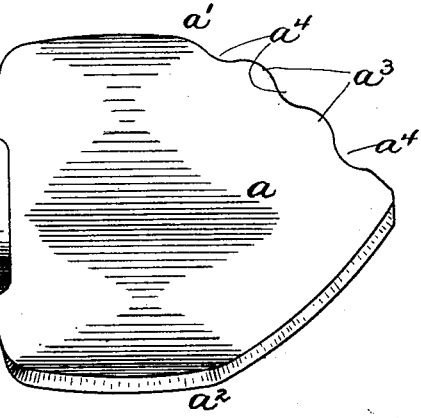
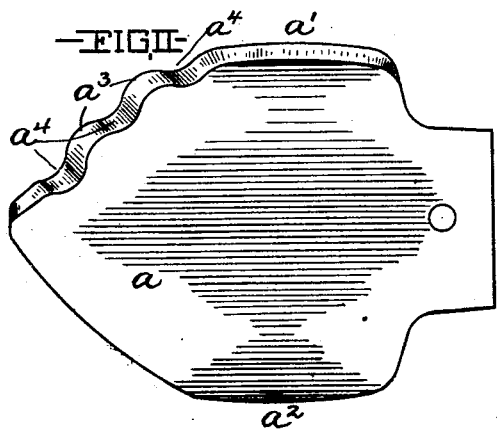
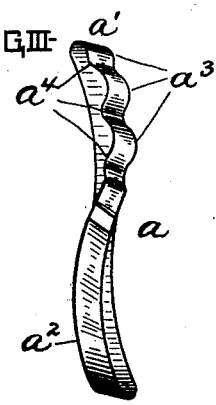
WITNESSES:
Daniel E. Daly.
Victor C. Lynch.
INVENTOR
Charles B. Easty
BY
Lynch & Dorer
his ATTORNEYS

UNITED STATES PATENT OFFICE.

CHARLES B. EASTY, OF GLENVILLE, OHIO.

ROTARY FLUE-CLEANING CUTTER.

SPECIFICATION forming part of Letters Patent No. 711,043, dated October 14, 1902.

Application filed September 26, 1899. Serial No. 731,782. (No model.)

*To all whom it may concern:*

Be it known that I, CHARLES B. EASTY, a resident of Glenville, county of Cuyahoga, and State of Ohio, have invented certain new and useful Improvements in Rotary Flue-Cleaning Cutters; and I do hereby declare the following to be a full, clear, and exact description of the invention, such as will enable others skilled in the art to which it pertains to make and use the same.

My invention relates to improvements in rotary flue-cleaning cutters; and it consists more especially in an improved construction of flue-scraping blade or cutter that is rotated within and fed through the tube that requires cleaning in any approved manner.

The object of this invention is to provide a stiff cutter that has two cutting edges converging toward the forward extremity of the cutter and one of the said edges being scalloped to render it capable of cutting grooves or channels and the other cutting edge being adapted to cut away the scale or deposit between the grooves or channels made by the scalloped edge of the cutter, and hence the work that the cutter is required to perform is distributed uniformly between the two edges of the cutter, so that the wear upon the cutting edges is equal or approximately equal.

It is well known that rotary flue-cleaners, wherein my improved cutter would be suitable, are operated by fluid under pressure.

The motor and the connection between the blade and the motor form no part of the present invention, and detailed illustration thereof is not considered necessary in this application.

In the accompanying drawings, Figures I and II are opposite side views, respectively, of a flue-cleaning cutter embodying my invention. Fig. III is a forward end elevation of the cutter. Fig. I shows a portion of a motor-shaft and the connection between the cutter and the said shaft.

My improved flue-cleaning cutter comprises a blade $a$, that is provided at its rear end and centrally with a shank $b$, that is pivoted, as at $c$, to and transversely of the one end of a link $d$, that has its opposite end pivoted, as at $e$, at right angles to the pivotal connection between the blade and the link to one end of the motor-shaft $f$, that is rotated and advanced during the operation of a flue-cleaner provided with my improved cutter in any approved manner. In the case illustrated the shank of the blade is formed by a piece that is separate from the piece that forms the blade. The peculiar illustrated link connection between the cutter and the motor-shaft forms a universal joint that accommodates the movement of the cutter through a curved flue.

The blade of my improved cutter is preferably flat upon opposite sides and provided with two diametrically opposite cutting edges $a'$ and $a^2$, formed upon opposite side edges, respectively, of the blade, and the said edges are suitably beveled or sharpened, as required, to form the desired cutting edges. The two cutting edges between the rear end of the blade and the central portion of the blade are preferably parallel or approximately so; but from the central portion of the blade to the blade's forward extremity the said cutting edges converge almost to a point at the blade's forward extremity. One of the cutting edges and edge $a'$ of the blade illustrated has its forward and inwardly-inclined portion scalloped, as at $a^3$, to render it capable of cutting grooves or channels in the scale or deposit formed internally of the tube that requires cleaning, so as to facilitate the said cutting edge in operating upon the scale or deposit, and the said scalloped cutting edge may be considered the forward cutting edge of the cutter. The other cutting edge $a^2$ of the cutter is preferably plain from end to end of the blade and may be considered the rear cutting edge of the cutter, and is adapted to effectually remove the scale or deposit not removed or only partially removed by the scalloped cutting edge. The scalloped cutting edge has the rounded depressions $a^4$, that are formed between the scallops $a^3$, arranged, therefore, inside of the annular path traversed by the plain cutting edge $a^2$ during the operation of the cutter.

My improved cutter has given very satisfactory results in practice. The cutter does the work for which it is designed effectively and the two cutting edges wear uniformly— that is, both cutting edges participate equally in the work upon the scale or deposit that requires to be removed.

A scalloped cutting edge having alternating rounded scallops or projections $a^3$ and depressions $a^4$ is preferable to an ordinary toothed or serrated edge, because it is more durable, especially for the work for which a flue-cleaner is designed, and my improved construction of cutter comprises a scalloped cutting edge having the alternating rounded swells and depressions formed upon the forward and inwardly-extending portion of the cutting edge. I would remark also that the cutting edge bearing portions of the cutter are preferably somewhat curved laterally in opposite directions, respectively, as shown in Fig. III.

It will be observed that the depressions $a^4$ of the scalloped cutting edge are arranged between the sweep of the plain cutting edge $a^2$ and the axial line of the cutter, so that the scales or incrustation not operated upon by the scalloped cutting edge, because of the depressions in the said edge, are removed by the plain cutting edge—that is, the scalloped cutting edge leaves ridges of scale, which are removed by the plain cutting edge. The work of removing scales from flues is too severe for a tool whose cutting edges are all plain. It is also too severe for a tool that has both of its cutting edges scalloped or that is otherwise rendered frail and not sufficiently strong to withstand the strain to which the tool is subjected. It is also important that the projections $a^3$ and the depressions $a^4$ of the scalloped cutting edge are rounded, because angular projections and angular depressions would render the said cutting edge frail and not sufficiently durable to withstand the great strain under which a tool of the character indicated must necessarily operate. By distributing the work, however, between the scalloped edge and a plain edge and having the projections and depressions of the scalloped cutting edge rounded a tool sufficiently durable and capable of operating with great facility is produced.

What I claim is—

A flue-cleaning blade comprising a body portion provided with two straight cutting edges arranged parallel to each other and a straight point having a straight cutting edge on one side and having a series of grooves and ridges formed in its other side, said grooves having curved bottoms and the intervening ridges having curved cutting-surfaces, substantially as described and for the purpose set forth.

Signed by me at Cleveland, Ohio, this 9th day of September, 1899.

CHARLES B. EASTY.

Witnesses:
C. H. DORER,
A. T. PARRATT.